US010834162B2

(12) United States Patent
Kato et al.

(10) Patent No.: US 10,834,162 B2
(45) Date of Patent: Nov. 10, 2020

(54) COMMUNICATION MANAGEMENT SERVER, COMMUNICATION SYSTEM, TRANSMITTING APPARATUS, COMMUNICATION METHOD, AND PROGRAM

(71) Applicants: Yoshinaga Kato, Kanagawa (JP);
Makoto Torikoshi, Kanagawa (JP);
Yoshiyuki Toda, Kanagawa (JP);
Tomohiro Ikeda, Kanagawa (JP)

(72) Inventors: Yoshinaga Kato, Kanagawa (JP);
Makoto Torikoshi, Kanagawa (JP);
Yoshiyuki Toda, Kanagawa (JP);
Tomohiro Ikeda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/675,977

(22) Filed: Nov. 6, 2019

(65) Prior Publication Data
US 2020/0169590 A1 May 28, 2020

(30) Foreign Application Priority Data

Nov. 26, 2018 (JP) .................................. 2018-220176
Sep. 27, 2019 (JP) .................................. 2019-176812

(51) Int. Cl.
*H04N 7/15* (2006.01)
*H04L 29/06* (2006.01)

(52) U.S. Cl.
CPC ........ *H04L 65/604* (2013.01); *H04L 65/4015* (2013.01); *H04N 7/15* (2013.01)

(58) Field of Classification Search
USPC ................................. 348/14.01, 14.09, 14.08
See application file for complete search history.

(56) References Cited

U.S. PATENT DOCUMENTS

| 2005/0021642 | A1 | 1/2005 | Nonaka |
| 2010/0226546 | A1* | 9/2010 | Tanaka .................... H04N 7/147 382/118 |

(Continued)

FOREIGN PATENT DOCUMENTS

| JP | 2012-178135 A | 9/2012 |
| JP | 2016-096487 A | 5/2016 |
| WO | WO 2019/026828 A1 | 2/2019 |

*Primary Examiner* — Maria El-Zoobi
(74) *Attorney, Agent, or Firm* — Oblon, McClelland, Maier & Neustadt, L.L.P.

(57) ABSTRACT

A communication management server manages communication with a sender terminal that transmits image data and a receive terminal that receives the image data. The communication management server includes processing circuitry. The processing circuitry receives from the receive terminal, sender terminal identification information identifying the sender terminal, and receive terminal identification information identifying the receive terminal. The processing circuitry transmits, to the sender terminal, request information indicating a request for transmitting image data of a first image type playable by the receive terminal, when a second image type of image data transmittable by the sender terminal according to the sender terminal identification information, and the first image type of image data playable by the receive terminal, according to the receive terminal identification information, are different.

11 Claims, 14 Drawing Sheets

(56) References Cited

U.S. PATENT DOCUMENTS

| | | |
|---|---|---|
| 2012/0185685 A1* | 7/2012 | Volmat .................. G06F 21/572 713/2 |
| 2014/0055555 A1* | 2/2014 | Imai .................. H04L 29/06523 348/14.09 |
| 2017/0163738 A1 | 6/2017 | Tamura |
| 2018/0248875 A1 | 8/2018 | Watanabe et al. |
| 2019/0080197 A1 | 3/2019 | Kato |

* cited by examiner

HEMISPHERICAL IMAGE(FRONT)

HEMISPHERICAL IMAGE(REAR)

CAPTURED IMAGE(EQUIRECTANGULAR PROJECTION IMAGE EC)

FIG. 10A

| SENDER TERMINAL ID | RECEIVER TERMINAL ID |
|---|---|
| 01aa | 02aa, 02ab, |
| 01ab | 02ac, 02ad |
| ... | ... |

FIG. 10B

| TERMINAL ID | TRANSMITTING IMAGE TYPE |
|---|---|
| 01aa | None(S→S, V) |
| 01ab | None(→V) |
| 01ac | None(→S) |
| ... | ... |

FIG. 10C

| TERMINAL ID | TRANSMITTING IMAGE TYPE |
|---|---|
| 02aa | S |
| 02ab | V |
| ... | ... |

FIG. 10D

| SENDER TERMINAL ID | VIDEO PLAYABLE RECEIVER TERMINAL ID | STILL IMAGE PLAYABLE RECEIVER TERMINAL ID |
|---|---|---|
| 01aa | (→02aa) | 02ab |
| 01ab | 02ac | |
| ... | ... | ... |

COMMUNICATION MANAGEMENT SERVER, COMMUNICATION SYSTEM, TRANSMITTING APPARATUS, COMMUNICATION METHOD, AND PROGRAM

CROSS-REFERENCE TO RELATED APPLICATIONS

This patent application is based on and claims priority pursuant to 35 U.S.C. § 119(a) to Japanese Patent Application No. 2018-220176, filed on Nov. 26, 2018 and 2019-176812, filed on Sep. 27, 2019, in the Japan Patent Office, the entire disclosure of which is incorporated herein by reference.

BACKGROUND

Technical Field

The present disclosure relates to a communication management server, a communication system, a transmitting apparatus, a communication method, and a program.

Description of the Related Art

In recent years, streaming is known as one of the methods for transmitting and reproducing image data such as moving images and still images. Thus, a communication terminal on a receiving side can play image data in real time through transmission of image data, captured with the communication terminal on the transmitting side, to the communication terminal on the receiving side.

SUMMARY

The present disclosure provides a communication management server that manages communication with a sender terminal that transmits image data and a receive terminal that receives the image data, the communication management server comprising processing circuitry configured to receive, from the receive terminal, sender terminal identification information identifying the sender terminal, and receive terminal identification information identifying the receive terminal; and transmit, to the sender terminal, request information indicating a request for transmitting image data of a first image type playable by the receive terminal, when a second image type of image data transmittable by the sender terminal according to the sender terminal identification information, and the first image type of image data playable by the receive terminal, according to the receive terminal identification information, are different.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4C is an illustration of an image in equirectangular projection generated from the images illustrated in FIGS. 4A and 4B;

FIG. 10A is a conceptual diagram illustrating a terminal communication management table;

FIG. 10B is a conceptual diagram illustrating a transmittable image type management table;

FIG. 10C is a conceptual diagram illustrating a playable image type management table;

FIG. 10D is a conceptual diagram illustrating a transfer image type management table;

Figure 1:
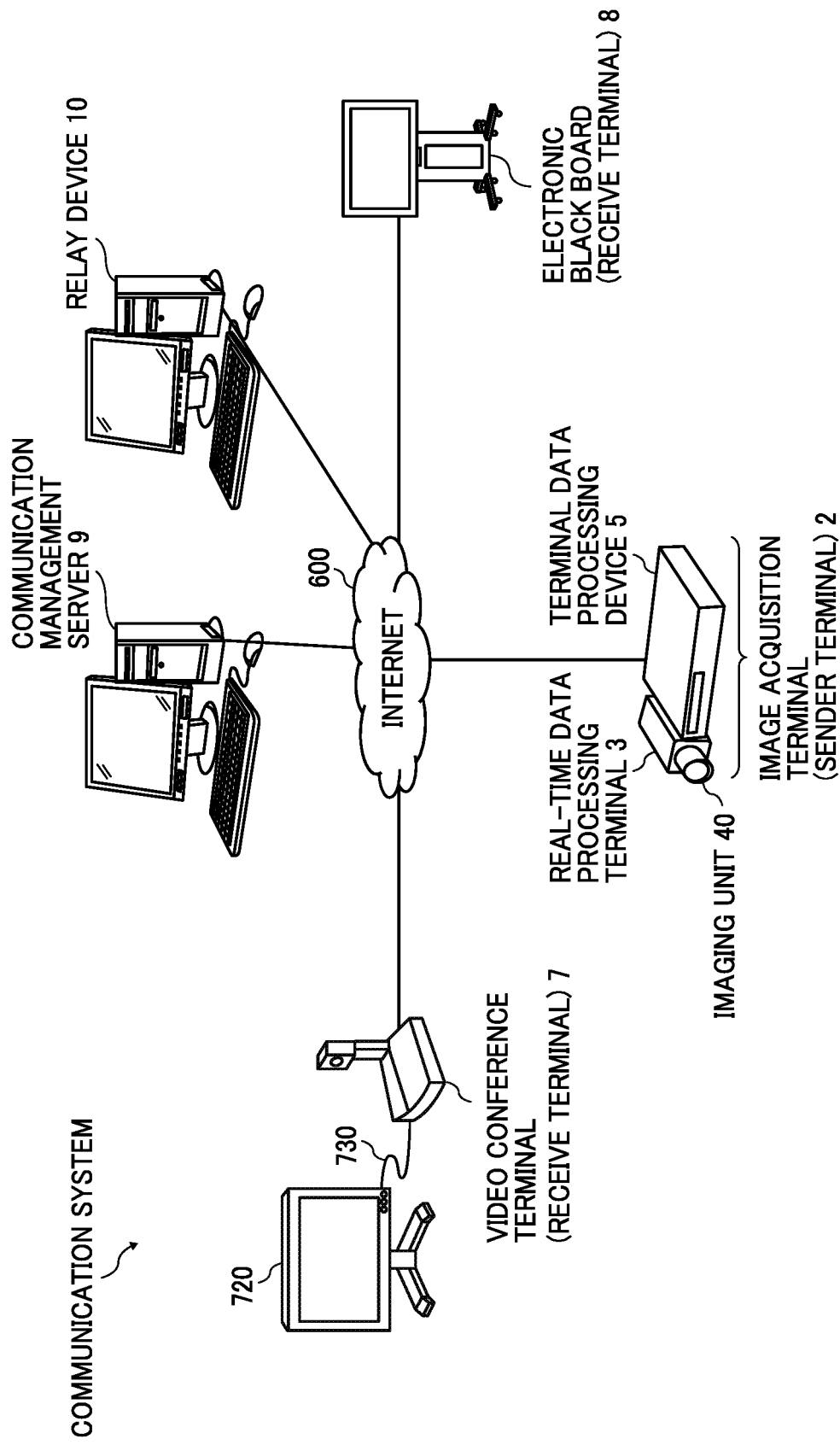
FIG. 1 is an entire configuration diagram of a communication system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring to the drawings, a description is given of an overview of an entire configuration of the communication system 1.

FIG. 1 is a schematic diagram illustrating the configuration of the communication system 1 according to the embodiment. As illustrated in FIG. 1, the communication system 1 according to the embodiment includes a real-time data processing terminal 3, a near-terminal data processing device 5, a video conference terminal 7, an electronic whiteboard 8, a communication management server 9, and a relay device 10.

The real-time data processing terminal 3 is a terminal that captures images in real time to obtain real-time captured image data. This processing to capture images in real time can be referred to as real-time processing. The real-time data processing terminal 3 is detachably connected to an imaging unit 40 provided with an image sensor that captures an image of a target, such as a Complementary Metal Oxide Semiconductor (CMOS) sensor or a Charge Coupled Device (CCD) sensor. Thereby, the real-time data processing terminal 3 digitizes the photographed image data input from the imaging unit 40, generates at least one of the moving image data and the still image data, and transmits the data to the near-terminal data processing device 5.

The near-terminal data processing device 5, which is located closely to the real-time data processing terminal 3, is connected to the real-time data processing terminal 3 in a one-to-one correspondence, for example, by a data bus, a Universal Serial Bus (USB), or the like. The terminal data processing device 5 encodes the still image data received from the real-time data processing terminal 3 into a general-purpose still image format, such as JPEG (Joint Photographic Experts Group), and then, via the communication network 600, transmits the encoded still image data to the relay device 10. The communication network 600 is an intranet, the Internet, or the like, and can communicate by wire or wirelessly. Further, the near-terminal data processing device 5 encodes moving image data received from the real-time data processing terminal 3 into a general-purpose moving image format, such as H.264, and then, via the communication network 600, transmits the encoded moving image data to the relay device. The real-time data processing terminal 3 and the near-terminal data processing device 5 are connected with each other so as to collectively function as an image acquisition terminal 2. Moreover, as a general-purpose moving image format, in addition to H.264, VP8, VP9, VP10, AV1, etc. can be used.

The video conference terminal 7 can play the moving image data sent from the relay device 10, can display a moving image (video) on the display 720, can play sound data sent from the relay device 10, and can output the sound data from the speaker 715. The display 720 is an example of display means, and is electrically connected to the video conference terminal 7 via a cable 730, such as a USB cable. In addition, the video conference terminal 7 plays the moving image data sent from the relay device 10 and displays the moving image (video) on the display 720. When a plurality of video conference terminals 7 are used, teleconferencing can be performed by transmitting and receiving moving image data and sound data via the relay device 10. The video conference terminal 7 of this embodiment can not play still image data.

The electronic whiteboard 8 plays the still image data sent from the relay device 10, and displays the still image on a display 820 (described later) of the electronic whiteboard 8. The user of the electronic whiteboard 8 can also draw characters and the like on the display 820 by using an electronic pen 8500, described later. The electronic whiteboard 8 of the present embodiment can not play the moving image data.

The communication management server 9 centrally manages login authentication from the video conference terminal 7 and the electronic whiteboard 8, management of the communication status of the video conference terminal 7 and the electronic whiteboard 8, and a communication status of the relay device 10.

The relay device 10 relays the image data sent from the image acquisition terminal 2 (near-terminal data processing device 5) via the communication network 600, and acts as a router to transmit data to the video conference terminal 7 and the electronic whiteboard 8 via the communication network 600.

The image acquisition terminal 2 is an example of a "send" terminal. The video conference terminal 7 and the electronic whiteboard 8 are examples of a "receive" terminal.

Hardware Configuration of the Communication System

Next, the hardware configuration of each element of the communication system of the present embodiment is described using from FIGS. 2 to 8.

Hardware Configuration of the Real-Time Data Processing Terminal

Figure 2:
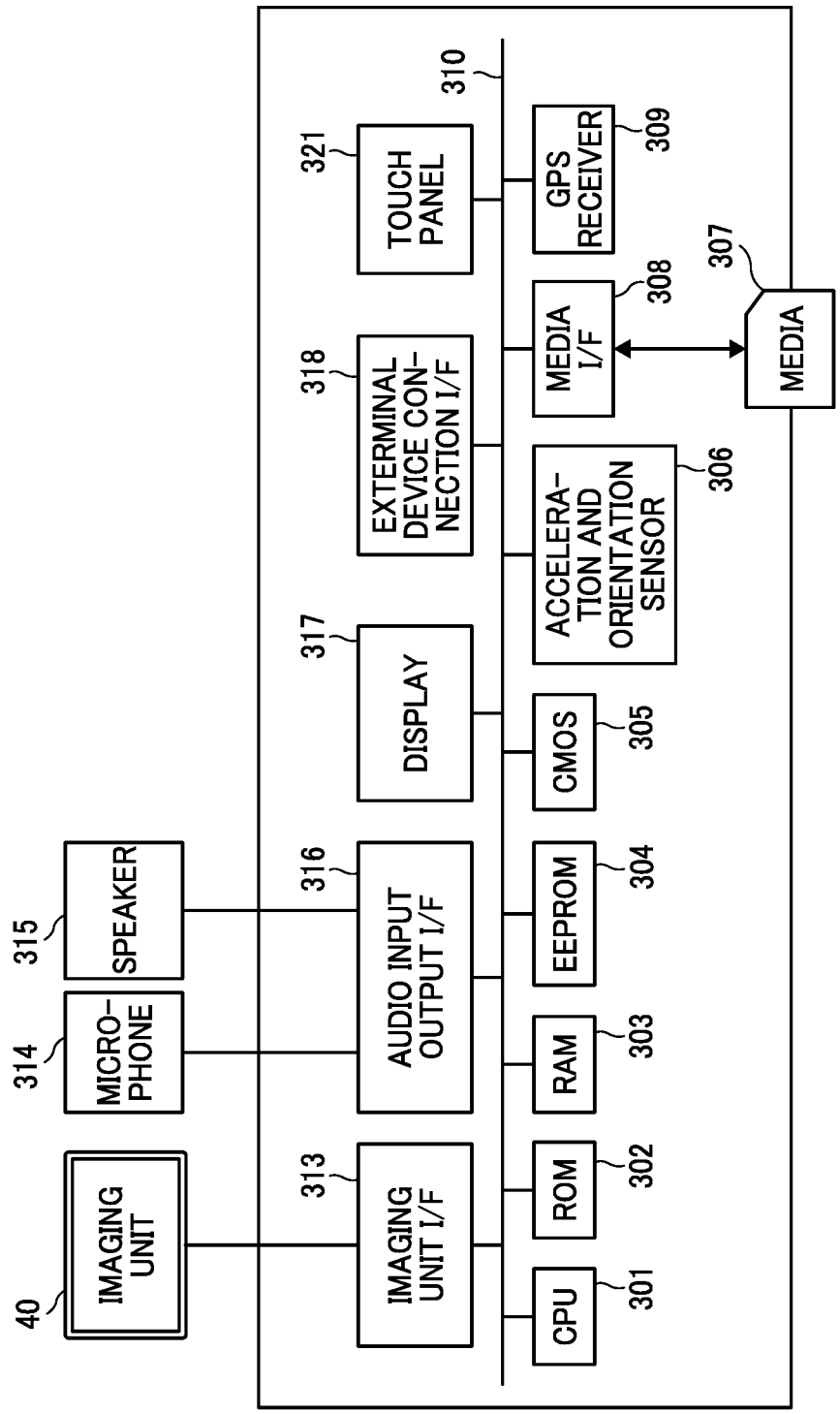
FIG. 2 is a hardware block diagram of a real-time data processing terminal.

FIG. 2 is a schematic diagram illustrating a hardware configuration of the real-time data processing terminal 3, according to one embodiment. The real-time data processing terminal 3 includes a CPU 301, a ROM 302, a RAM 303, an EEPROM 304, a CMOS sensor (CMOS) 305, an acceleration and orientation sensor 306, a media I/F 308, and a GPS receiver 309.

The CPU 301 controls the entire operation of the real-time data processing terminal 3. The ROM 302 stores a control program for operating the CPU 301. The RAM 303 is used as a work area for the CPU 301. The EEPROM 304 reads or writes various data such as a control program for the real-time data processing terminal under control of the CPU 301. Under control of the CPU 301, the CMOS sensor 305 captures an image of a target (mainly a blind spot of the imaging unit 40) to obtain image data. The acceleration and orientation sensor 306 includes various sensors, such as an electromagnetic compass for detecting geomagnetism, a gyrocompass, and an acceleration sensor. The media I/F 308 controls reading or writing of data with respect to a recording medium 307, such as a flash memory. The GPS receiver 309 receives a GPS signal from GPS satellites.

The real-time data processing terminal 3 further includes an imaging unit I/F 313, a microphone 314, a speaker 315, an audio input/output I/F 316, a display 317, an external device connection I/F 318, and a touch panel 321.

The imaging unit I/F 313 is a circuit that controls driving of the imaging unit 40 when an external imaging unit 40 is connected to the real-time data processing terminal 3. The microphone 314 is an example of a built-in audio collecting device configured to input audio under control of the CPU 301. The audio I/O I/F 316 is a circuit for inputting or outputting an audio signal between the microphone 314 and the speaker 315 under control of the CPU 301. The display 317 can be a liquid crystal or organic electro-luminescence (EL) display that displays an image of a target, an operation icon, or the like. The external device connection I/F 318 is an interface circuit that connects the real-time data processing terminal 3 to various external devices. The touch panel 321 is an example of an input device that enables the user to input a user instruction to the real-time data processing terminal 3 by touching a screen of the display 317.

The real-time data processing terminal 3 further includes a bus line 310. The bus line 310 is an address bus or a data bus, which electrically connects the elements in FIG. 2, such as the CPU 301.

Hardware Configuration of the Imaging Unit

Figure 3A:
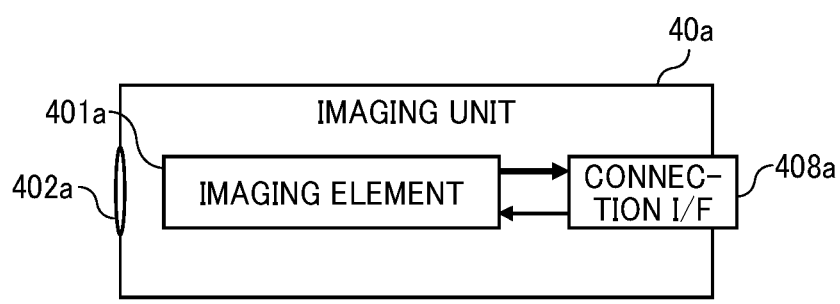
FIGS. 3A and 3B are each a hardware block diagram of an imaging unit.
Figure 3B:
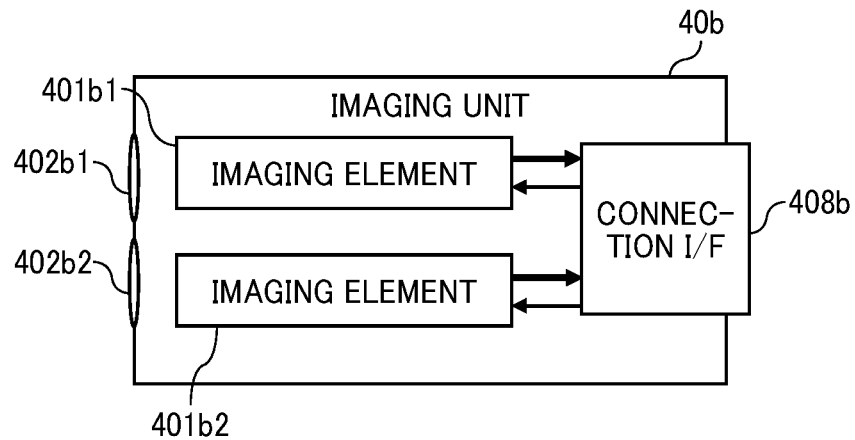

FIGS. 3A and 3B are each a schematic block diagram illustrating a hardware configuration of the imaging unit 40, according to different embodiments. Specifically, FIG. 3A illustrates a hardware configuration of a monocular imaging unit 40a, as an example of the imaging unit 40. FIG. 3B illustrates a hardware configuration of a compound eye imaging unit 40b, as an example of the imaging unit 40. The imaging unit 40 is a generic term for a plurality of types of imaging units (e.g., imaging unit 40a, 40b, etc.) having different number of imaging elements.

As illustrated in FIG. 3A, the imaging unit 40a includes an imaging element 401a such as a CMOS or a CCD, a lens 402a, and a connection I/F 408a to be electronically connected to the imaging unit I/F 313 of the real-time data processing terminal 3. When the imaging unit 40a is connected to the imaging unit I/F 313 of the real-time data processing terminal 3, the imaging element 401a captures an image according to an imaging control signal transmitted from the imaging unit I/F 313 via the connection I/F 408a. Accordingly, the imaging unit 40a illustrated in FIG. 3A obtains a planar image.

As illustrated in FIG. 3B, the imaging unit 40b includes imaging elements 401b1 and 401b2 each of which can be a CMOS or a CCD, lenses 402b1 and 402b2, and a connection I/F 408b to be electronically connected to the imaging unit I/F 313 of the real-time data processing terminal 3. The lenses 402b1 and 402b2 are, for example, fisheye lenses. When the imaging unit 40b is connected to the imaging unit I/F 313 of the real-time data processing terminal 3, each of the imaging element 401b1 and 401b2 captures an image according to an imaging control signal transmitted from the imaging unit I/F 313 via the connection I/F 408b, and transmits the captured image to the imaging unit I/F 313. Accordingly, a plurality of images is transmitted as captured image data. Accordingly, the imaging unit 40b illustrated in FIG. 3B obtains a spherical image, which may be referred to as an equirectangular projection image, as described below.

Figure 4A:
FIG. 4A is an illustration of a hemispherical image (front side), respectively captured by the imaging unit of FIG. 3B.
Figure 4B:
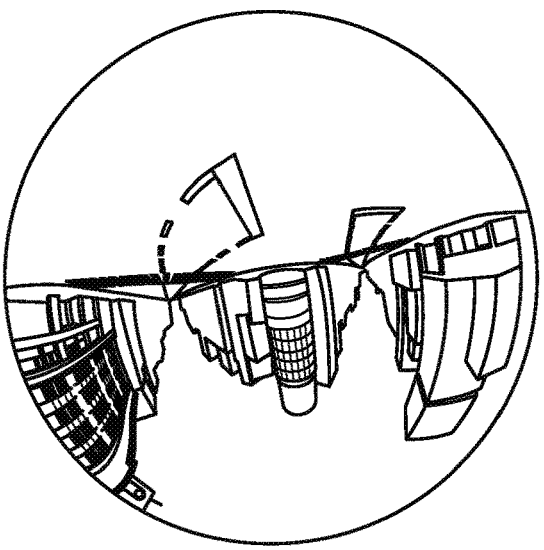
FIG. 4B is an illustration of a hemispherical image (back side), respectively captured by the imaging unit of FIG. 3B.
Figure 4C:
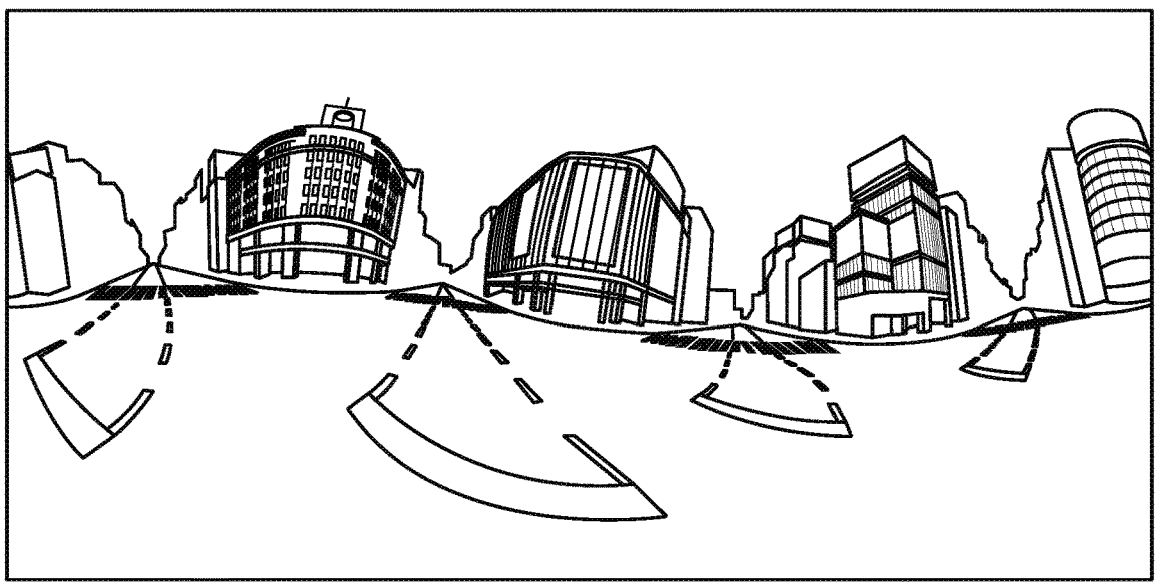
FIG. 4C is an illustration of a hemispherical image (back side), respectively captured by the imaging unit of FIG. 3B.

Next, referring to FIGS. 4A to 4C, a description is given of an overview of an operation of generating an equirectangular projection image EC from the images captured by the imaging unit 40b. FIG. 4A is a view illustrating a hemispherical image (front side) captured by the imaging unit 40b. FIG. 4B is a view illustrating a hemispherical image (back side) captured by the imaging unit 40b. FIG. 4C is a view illustrating an image in equirectangular projection, which is referred to as an "equirectangular projection image" (or "equidistant cylindrical projection image") EC.

As illustrated in FIG. 4A, an image captured by the imaging element 401b1 is a curved hemispherical image (front side) taken through the lens 402b1. Similarly, as illustrated in FIG. 4B, an image captured by the imaging element 401b2 is a curved hemispherical image (back side) taken through the lens 402b2. The hemispherical image (front side) and the hemispherical image (back side), which are reversed by 180-degree from each other, are combined by the real-time data processing terminal 3. This results in the generation of the equirectangular projection image EC, as illustrated in FIG. 4C.

Hardware Configuration of the Near-Terminal Data Processing Device

Figure 5:
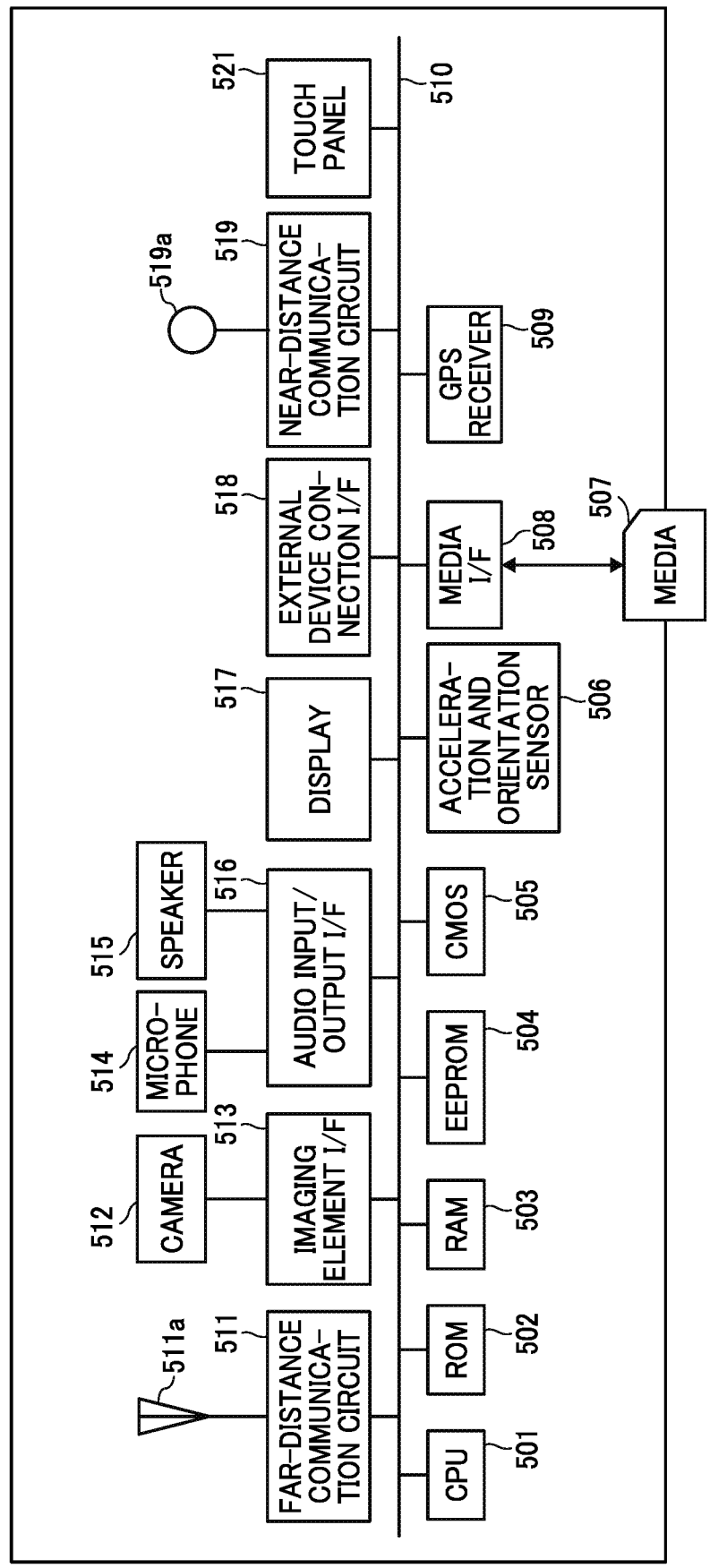
FIG. 5 is an illustration of a hardware configuration of a near terminal data processing device.

FIG. 5 is a schematic diagram illustrating a hardware configuration of the near-terminal data processing device 5, according to one embodiment. As illustrated in FIG. 5, the terminal data processing device 5 includes a CPU 501, a ROM 502, a RAM 503, an EEPROM 504, a CMOS sensor 505, an acceleration and orientation sensor 506, a medium I/F 508, and a GPS receiver 509.

The CPU 501 controls the entire operation of the near-terminal data processing device 5. The ROM 502 stores a control program for controlling the CPU 501. The RAM 503 is used as a work area for the CPU 501. The EEPROM 504 reads or writes various data, such as a control program for the near-terminal data processing device under control of the CPU 501. The CMOS sensor 505 captures an object (for example, a self-image of the user operating the near-terminal data processing device 5) under control of the CPU 501 to obtain captured image data. The acceleration and orientation sensor 506 includes various sensors, such as an electromagnetic compass for detecting geomagnetism, a gyrocompass, and an acceleration sensor. The medium I/F 508 controls reading or writing of data with respect to a recording medium 507, such as a flash memory. The GPS receiver 509 receives a GPS signal from GPS satellites.

The near-terminal data processing device 5 further includes a far-distance communication circuit 511, an antenna 511a for the far-distance communication circuit 511, a camera 512, an imaging element I/F 513, a microphone 514, a speaker 515, an audio input/output I/F 516, a display 517, an external device connection I/F 518, a near-distance communication circuit 519, an antenna 519a for the near-distance communication circuit 519, and a touch panel 521.

The far-distance communication circuit 511 is a circuit that communicates with another device through the Internet 600. The camera 512 is an example of a built-in imaging device configured to capture a target under control of the CPU 501. The imaging element 1/F 513 is a circuit that controls driving of the camera 512. The microphone 514 is an example of built-in audio collecting device configured to input audio under control of the CPU 501. The audio I/O I/F 516 is a circuit for inputting or outputting an audio signal between the microphone 514 and the speaker 515 under control of the CPU 501. The display 517 can be a liquid crystal or organic electro luminescence (EL) display that displays an image of a subject, an operation icon, or the like. The external device connection I/F 518 is an interface circuit that connects the terminal data processing device 5 to various external devices. The near-distance communication circuit 519 is a communication circuit that communicates in compliance with the near-field radio communication (NFC) (Registered Trademark), the Bluetooth (Registered Trademark), and the like. The touch panel 521 is an example of input device that enables the user to input a user instruction for operating the near-terminal data processing device 5 through touching a screen of the display 517.

The near-terminal data processing device 5 further includes a bus line 510. The bus line 510 can be an address bus or a data bus, which electrically connects various elements such as the CPU 501 of FIG. 5.

Hardware Configuration of the Video Conference Terminal

Figure 6:
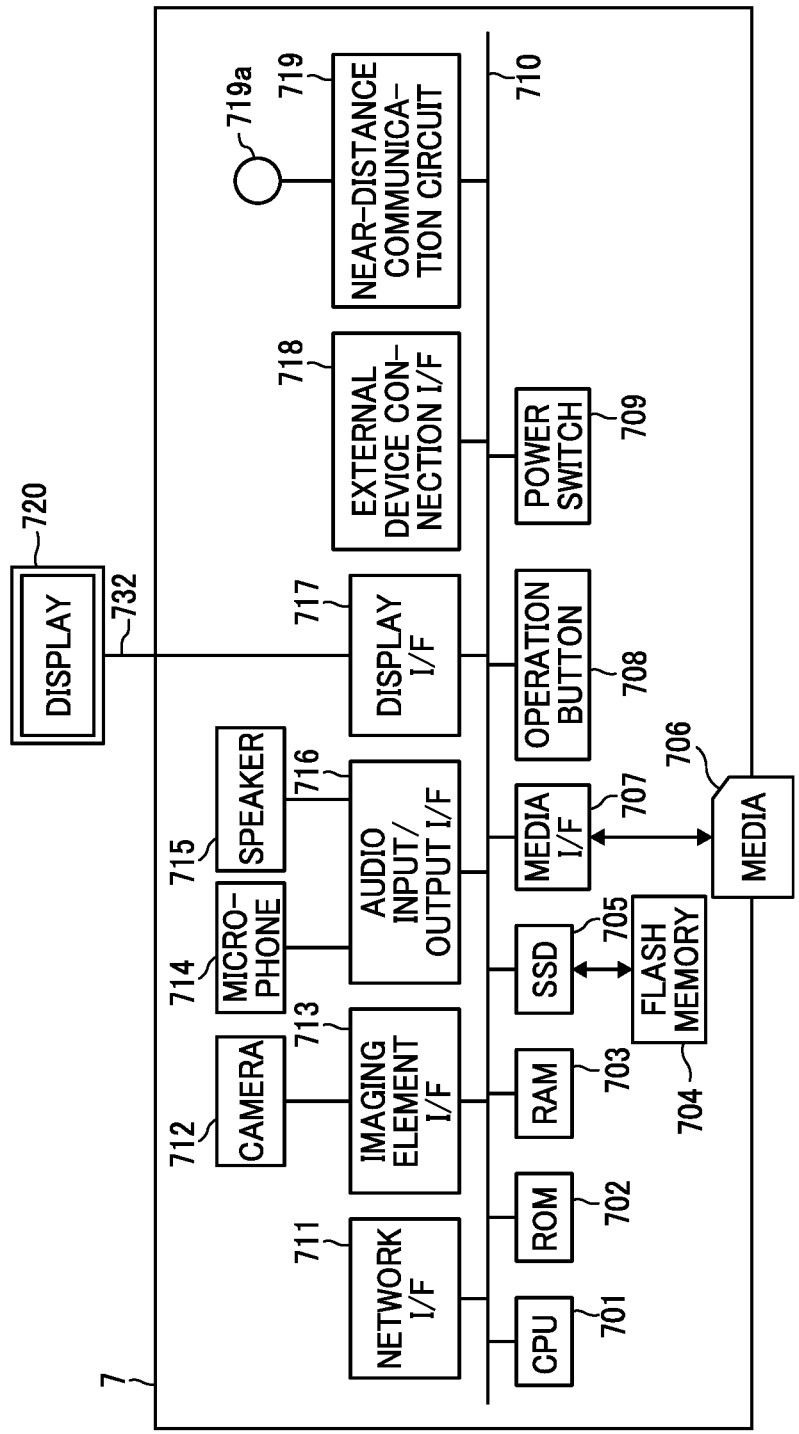
FIG. 6 is an illustration of a hardware configuration of a video conference terminal.

FIG. 6 is a schematic diagram illustrating a hardware configuration of the video conference terminal 7. As illustrated in FIG. 6, the video conference terminal 7 includes a CPU 701, a ROM 702, a RAM 703, a flash memory 704, a SSD 705, a medium I/F 707, an operation key 708, a power switch 709, a bus line 710, a network I/F 711, a camera 712, an imaging element I/F 713, a microphone 714, a speaker 715, an audio input/output I/F 716, a display I/F 717, an external device connection I/F 718, a near-distance communication circuit 719, and an antenna 719a for the near-distance communication circuit 719. The CPU 701 controls an entire operation of the video conference terminal 7. The ROM 702 stores a control program for controlling the CPU 701 such as an IPL. The RAM 703 is used as a work area for the CPU 701. The flash memory 704 stores various data such as a communication control program, image data, and audio data. The SSD 705 controls reading or writing of various data with respect to the flash memory 704 under control of the CPU 701. In an alternative to the SSD, a hard disk drive (HDD) can be used. The medium I/F 707 controls reading or writing of data with respect to a recording medium 706 such as a flash memory. The operation key 708 is operated by a user to input a user instruction such as a user selection of a destination of the video conference terminal 7. The power switch 709 turns on or off the power of the video conference terminal 7.

The network I/F 711 is an interface that controls communication of data with an external device through the Internet 600. The camera 712 is an example of built-in imaging device capable of capturing a target under control of the CPU 701. The imaging element I/F 713 is a circuit that controls driving of the camera 712. The microphone 714 is an example of a built-in audio collecting device configured to input audio under control of the CPU 701. The audio I/O I/F 716 is a circuit for inputting or outputting an audio signal between the microphone 714 and the speaker 715 under control of the CPU 701. The display I/F 717 is a circuit for transmitting display data to the external display 720 under control of the CPU 701. The external device I/F 718 is an interface circuit that connects the video conference terminal 7 to various external devices. The near-distance communication circuit 719 is a communication circuit that communicates in compliance with the near-field radio communication (NFC) (Registered Trademark), the Bluetooth (Registered Trademark), and the like.

The bus line 710 can be an address bus or a data bus, which electrically connects various elements such as the CPU 701 of FIG. 6.

The display 720 can be a liquid crystal or organic electroluminescence (EL) display that displays an image of a subject, an operation icon, or the like. The display 720 is connected to the display I/F 717 by a cable 732. The cable 732 can be an analog red-green-blue (RGB) (video graphic array (VGA)) signal cable, a component video cable, a high-definition multimedia interface (HDMI) signal cable, or a digital video interactive (DVI) signal cable. Here, it is assumed that the cable 732 is the HDMI cable.

Note that the display 720 is a generic term for displays 720a and 720b to be described later. The HDMI cable 732 is a generic term for the HDMI cables 732a and 732b to be described later.

The camera 712 includes a lens and a solid-state imaging element that converts an image (video) of a subject to electronic data through photoelectric conversion. As the solid-state imaging element, for example, a complementary metaloxide-semiconductor (CMOS) or a charge-coupled device (CCD) is used. The external device connection I/F 718 is configured to connect an external device such as an external camera, an external microphone, or an external speaker through a USB cable or the like. In the case where an external camera is connected, the external camera is driven in preference to the built-in camera 712 under control of the CPU 701. Similarly, in the case where an external microphone is connected or an external speaker is connected, the external microphone or the external speaker is driven in preference to the built-in microphone 714 or the built-in speaker 715 under control of the CPU 701.

The recording medium 706 is removable from the video conference terminal 7. Any non-volatile memory such as an electrically erasable and programmable read-only memory (EEPROM) can be used instead of the flash memory 704, as long as the memory reads or writes data under control of the CPU 701.

Hardware Configuration of the Electronic Whiteboard

Figure 7:
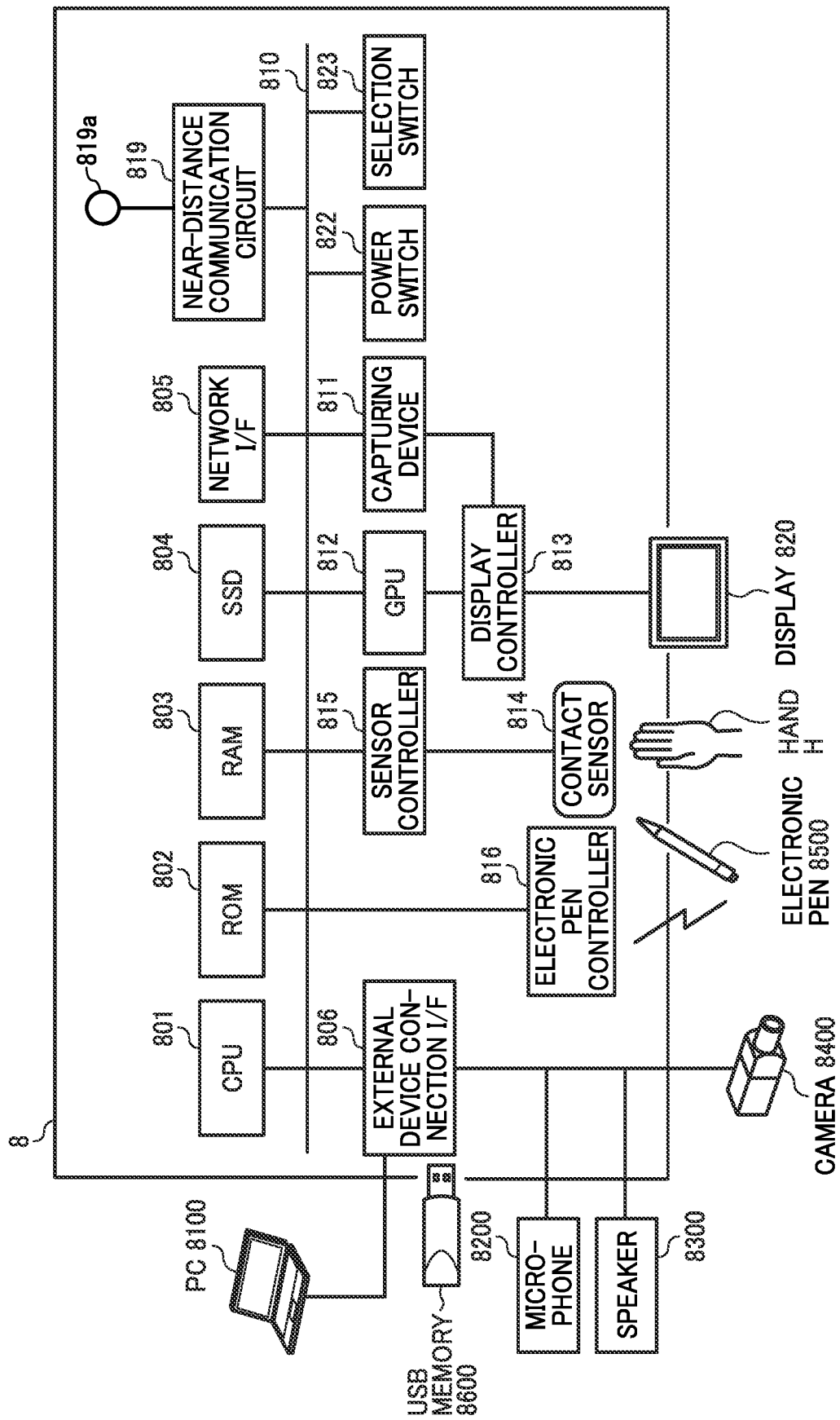
FIG. 7 is an illustration of a software configuration of the real-time data processing terminal and the terminal data processing device in an image acquisition terminal.

FIG. 7 is a diagram illustrating a hardware configuration of the electronic whiteboard 8 according to one embodiment. As illustrated in FIG. 7, the electronic whiteboard 8 includes a central processing unit (CPU) 801, a read only memory (ROM) 802, a random access memory (RAM) 803, a solid state drive (SSD) 804, a network interface (I/F) 805, and an external device connection interface (I/F) 806.

The CPU 801 controls the entire operation of the electronic whiteboard 8. The ROM 802 stores a control program for operating the CPU 801 such as an Initial Program Loader (IPL). The RAM 803 is used as a work area for the CPU 801. The SSD 804 stores various data such as the control program for the electronic whiteboard 8. The network I/F 805 controls communication with an external device through the communication network 600. The external device connection I/F 806 controls communication with a Universal Serial Bus (USB) memory 8600, and external devices including a camera 8400, a speaker 8300, and a microphone 8200.

The electronic whiteboard 8 further includes a capturing device 811, a graphics processing unit (GPU) 812, a display controller 813, a contact sensor 814, a sensor controller 815, an electronic pen controller 816, a near-distance communication circuit 819, an antenna 819a for the near-distance communication circuit 819, and a power switch 822.

The capture device 811 captures an image displayed on the display of the PC 8100 and causes the display 820 to display the image. The capturing device 811 is connected to the PC 8100 by a cable. This cable can be a cable for analog Red-Green-Blue (RGB) (video graphics array (VGA)) signal, a cable for component video, or a cable for a high-definition multimedia interface (HDMI) (registered trademark), a digital video interactive (DVI), a universal serial bus (USB), or a display port. The GPU 812 is a semiconductor chip dedicated to processing a graphical image. The display controller 813 outputs an image processed with the GPU 812 to a display 820, for example. The contact sensor 814 detects a touch onto the display 820 with an electronic pen 8500 or a user's hand H. The sensor controller 815 controls the contact sensor 814. The contact sensor 814 senses a touch input to a specific coordinate on the display 820 using the infrared blocking system. More specifically, the display 820 is provided with two light-receiving elements disposed on both upper side ends of the display 820, and a reflector frame disposed at the sides of the display 820. The light receiving elements emit a plurality of infrared rays in parallel to a surface of the display 820. The light receiving elements receive light passing in a direction that is the same as an optical path of the emitted infrared rays, which are reflected by the reflector frame. The contact sensor 814 outputs an identifier (ID) of the infrared ray that is blocked by an object after being emitted from the light receiving elements, to the sensor controller 815. Based on the ID of the infrared ray, the sensor controller 815 detects a specific coordinate that is touched by the object. The electronic pen controller 816 communicates with the electronic pen 8500 to detect a touch by the tip or bottom of the electronic pen 8500 to the display 820. The near-distance communication circuit 819 is a communication circuit that communicates in compliance with, for example, NFC or Bluetooth. The power switch 822 is a switch for turning on or off the power of the electronic whiteboard 8. The selection switches 823 are, for example, a group of switches for adjusting the brightness, shade, and the like of the display of the display 820.

The electronic whiteboard 8 further includes a bus line 810. The bus line 810 is an address bus or a data bus that electrically connects the elements in FIG. 7, such as the CPU 801, to each other.

The contact sensor 814 is not limited to the infrared blocking system type, and can be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display. In addition or in alternative to detecting a touch by the tip or bottom of the electronic pen 8500, the electronic pen controller 816 can also detect a touch by another part of the electronic pen 8500, such as a part held by a hand of the user.

Hardware Configuration of the Communication Management Server

Figure 8:
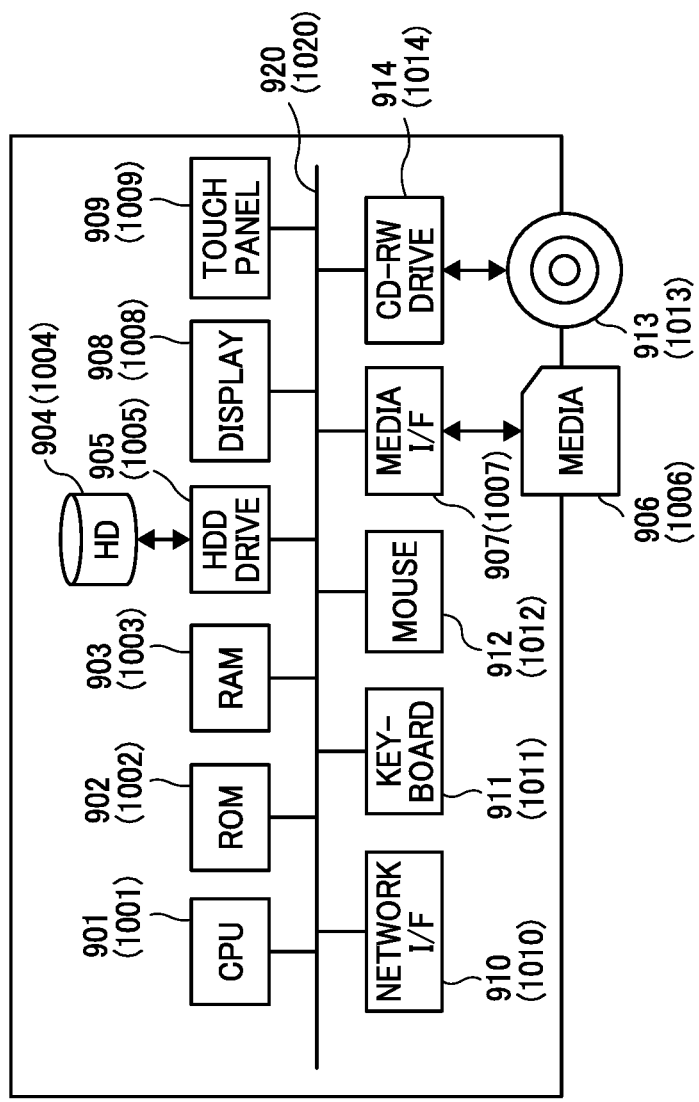
FIG. 8 is an illustration of a hardware configuration of a communication management server and a relay device.

FIG. 8 is a diagram illustrating a hardware configuration of a communication management server 9 according to the embodiment. As illustrated in FIG. 8, the communication management server 9, which is implemented by a computer, includes a CPU 901, a ROM 902, a RAM 903, a hard disk (HD) 904, a hard disk drive (HDD) 905, a recording medium 906, a medium I/F 907, a display 908, a touch panel 909, a network I/F 910, a keyboard 911, a mouse 912, a Compact Disc Rewritable (CD-RW) drive 914, and a bus line 920. In addition, since the communication management server 9 functions as a server, the input device such as the keyboard 911 and the mouse 912 or the output device such as the display 908 might not be necessary.

The CPU 901 controls the entire operation of the communication management server 9. The ROM 902 stores a control program for controlling the CPU 901; such as an IPL. The RAM 903 is used as a work area for the CPU 901. The HD 904 stores various data such as a control program. The HDD 905 controls reading and writing of various data to or from the HD 904 under control of the CPU 901. The medium I/F 907 controls reading and writing of data with respect to a recording medium 906 such as a flash memory. The display 908 displays various information including a cursor, a menu, a window, characters, and an image. The touch panel 909 is an example of an input device that can be operated by directly touching the menu screen displayed on the display 908 with a finger. The network I/F 910 is an interface that controls data communication performed with an external device through the communication network 600. The keyboard 911 is one example of an input device provided with a plurality of keys for allowing a user to input characters, numerals, or various instructions. The mouse 912 is another example of the input device with which the user selects a specific instruction for execution, selects a target for processing, and moves a displayed cursor. The CD-RW drive 914 reads and writes various data with respect to a CD-RW 913, which is one example of a removable recording medium. The communication management server 9 further includes a bus line 920. The bus line 920 is an address bus or a data bus that electrically connects the elements in FIG. 8, such as the CPU 901, to each other.

Hardware Configuration of the Relay Device

The relay device 10 basically has the same configuration as the communication management server. As illustrated in FIG. 8, the relay device 10, which is implemented by a computer, includes a CPU 1001, a ROM 1002, a RAM 1003, a hard disk (HD) 1004, a hard disk drive (HDD) 1005, a recording medium 1006, a medium I/F 1007, a display 1008, a network I/F 1009, a network I/F 1010, a keyboard 1011, a mouse 1012, a Compact Disc Rewritable (CD-RW) drive 1014, and a bus line 1020. Note, since the relay device 10 functions as a router, the input device such as the keyboard 1011 and the mouse 1012 or the output device such as the display 1008 might not be necessary. The CPU 1001, the ROM 1002, the RAM 1003, the hard disk (HD) 1004, the hard disk drive (HDD) 1005, the recording medium 1006, the medium I/F 1007, the display 1008, the network I/F 1009, the network I/F 1010, the keyboard 1011, the mouse 1012, the Compact Disc Rewritable (CD-RW) drive 1014, and the bus line 1020 have the same configuration as the CPU 901, the ROM 902, the RAM 903, the hard disk (HD) 904, the hard disk drive (HDD) 905, the recording medium 906, the medium I/F 907, the display 908, the network I/F 909, the network I/F 910, the keyboard 911, the mouse 912, the Compact Disc Rewritable (CD-RW) drive 914 and the bus line 920, respectively, and the description thereof is omitted.

Functional Configuration of the Communication System

Figure 9:
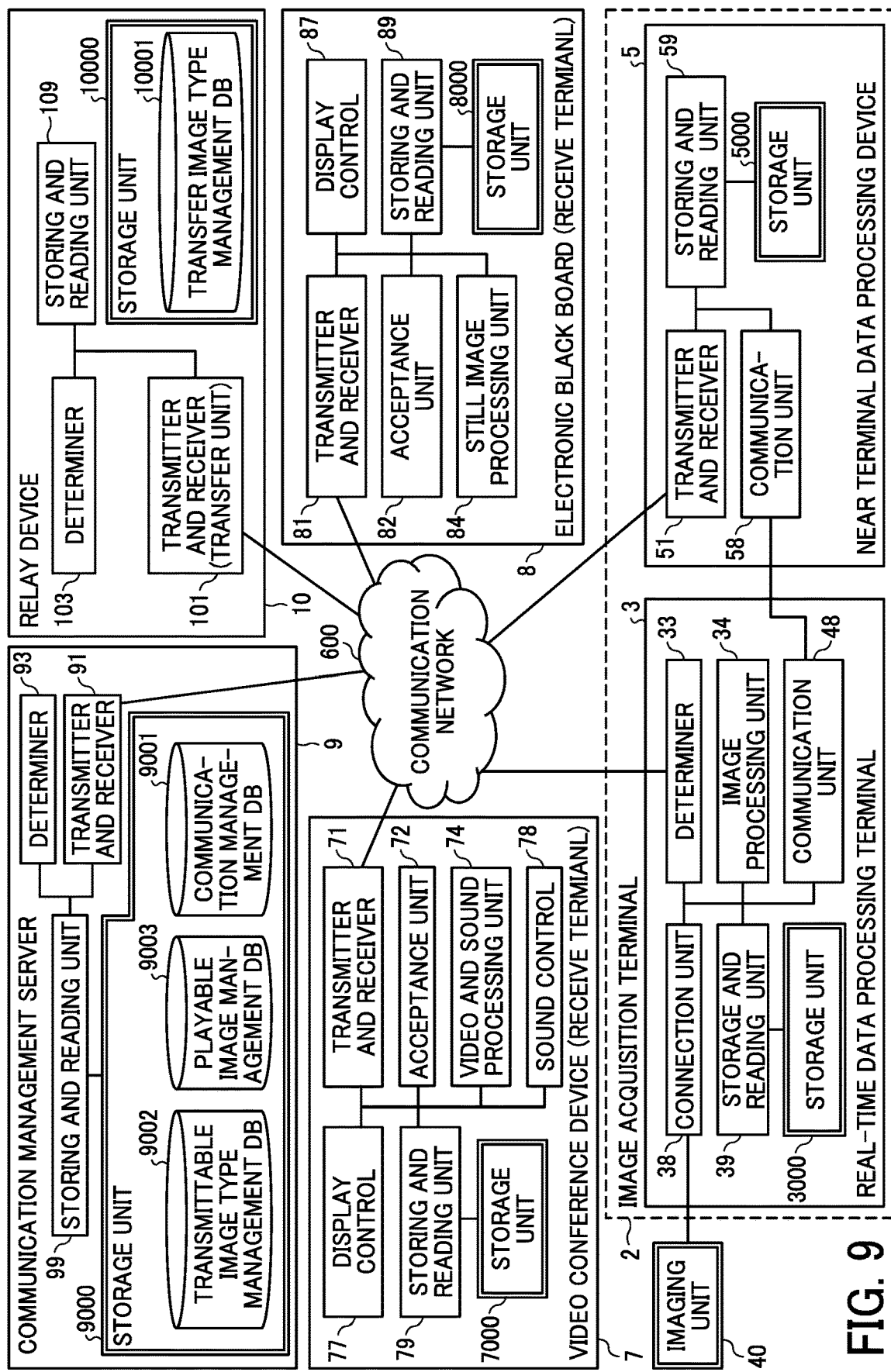
FIG. 9 is a functional block diagram of the communication system according to one embodiment.

Subsequently, each functional configuration of the communication system is described by using the drawings. First, referring to FIG. 9 and FIGS. 10A, 10B, 10C, and 10D, functional configurations of the terminals, apparatuses, and servers in the communication system 1 are described, according to one embodiment. FIG. 9 is a schematic block diagram illustrating a functional configuration of the communication system.

Functional Configuration of Real-Time Data Processing Terminal

Referring to FIG. 9, the real-time data processing terminal 3 includes a determiner 33, an image processing unit 34, a connection unit 38, a storing and reading unit 39, and a communication unit 48. These units are functions that are implemented by or that are caused to function by operating any of the hardware components illustrated in FIG. 2 in cooperation with the instructions of the CPU 301 according to the control program expanded from the EEPROM 304 to the RAM 303. Further, the real-time data processing terminal 3 has a storage unit 3000 constructed by the ROM 302, the RAM 303, and the EEPROM 304 shown in FIG. 2.

Next, each functional configuration of the real-time data processing terminal 3 is described in more detail by using FIG. 9. The determiner 33 of the real-time data processing terminal 3 is realized, for example, by the processing of the CPU 301, and makes various determinations. The image processing unit 34 is realized by the processing of the CPU 301, digitizes the image data input from the imaging unit 40, and generates at least one of moving image data and still image data. The image processing unit 34 generates, for example, moving image data in real time (for example, at intervals of 1/60 of a second) or generates still image data.

The connection unit 38, which is implemented by the imaging unit I/F 313 and the instructions of the CPU 301, is an interface for mechanically and electrically connecting the imaging unit 40 to the real-time data processing terminal 3.

The storing and reading unit 39, which is implemented by instructions of the CPU 301, stores various data or information in the storage unit 3000 or reads out various data or information from the storage unit 3000.

The communication unit 48, which can be implemented by the instructions of the CPU 301 and the external device connection I/F 318, transmits or receives various data (or information) to or from the communication unit 58 of the terminal data processing device 5. The one-to-one communication between the communication unit 48 and the communication unit 58 can be performed via a wired network or a wireless network.

Functional Configuration of the Near-Terminal Data Processing Device

As illustrated in FIG. 9, the near-terminal data processing device 5 includes a transmitter and receiver 51, a communication unit 58, and a storing and reading unit 59. These units are functions that are implemented by or that are caused to function by operating any of the elements illustrated in FIG. 5 in cooperation with the instructions of the CPU 501 according to the control program expanded from the EEPROM 504 to the RAM 503.

The near-terminal data processing device 5 further includes a storage unit 5000, which is implemented by the ROM 502, RAM 503, and EEPROM 504 illustrated in FIG. 5.

Functional Configuration of the Video Conference Terminal

As shown in FIG. 9, the video conference terminal 7 includes a transmitter and a receiver 71, an acceptance unit 72, a video and sound processing unit 74, a display control unit 77, a sound control unit 78, and a storing and reading unit 79. These units are functions or means implemented by any of the components shown in FIG. 6 being operated by instructions from the CPU 701 according to a program expanded on the RAM 703 from the flash memory 704 in the video conference terminal 7.

Also, the video conference terminal 7 has a storage unit 7000 constructed by the ROM 702, the RAM 703, and the flash memory 704 shown in FIG. 6.

Functional Configuration of the Video Conference Terminal

The transmitter and receiver 71 in the video conference terminal 7 is realized by the processing of the network I/F 711 and the CPU 701 of the video conference terminal 7, and transmits and receives various data (or information) with other terminals, devices, and servers via the communication network 600.

The acceptance unit 72 is realized by the processing of the operation button 708 and the CPU 701 in the video conference terminal 7, and receives various operations of the user.

The video and sound processing unit 74 plays the moving image data sent from the relay device 10, displays a moving image (video) on the display 720, or plays the sound data sent from the relay device 10 and output to the speaker 715. The video and sound processing unit 74 can not play still image data.

The display control unit 77 is realized by the processing of the CPU 701 in the video conference terminal 7, and causes the display 720, which is an example of a display unit, to display a moving image.

The sound control unit 78 is realized by the processing of the CPU 701 in the video conference terminal 7 and controls sound collection in the microphone 714 or controls the output of sound in the speaker 715.

The storage/readout unit 79 is realized by the processing of the CPU 701 in the video conference terminal 7 and stores various data (or information) in the storage unit 7000 or reads out various data (or information) from the storage unit 7000.

Functional Configuration of the Electronic Whiteboard

As shown in FIG. 9, the electronic whiteboard 8 includes a transmitter and receiver 81, an acceptance unit 82, a still image processing unit 84, a display control unit 87, and a storing and reading unit 89. These units are functions or means implemented by any of the components shown in FIG. 7 being operated by instructions from the CPU 801 in the electronic whiteboard 8 according to a program expanded on the RAM 803 from the SSD 804.

Further, the electronic whiteboard 8 has a storage unit 8000 constructed by the ROM 802, the RAM 803, and the flash memory 804 shown in FIG. 7.

Each Function Configuration of the Electronic Whiteboard

The transmitter and receiver 81 of the electronic whiteboard 8 is realized by the processing of the network I/F 805 and the CPU 801 in the electronic blackboard 8, and transmits and receives various data (or information) with other terminals, devices, and servers via the communication network 600.

The acceptance unit 82 is realized by the processing of the selection switches 823 and the CPU 801 in the electronic whiteboard 8 and receives various operations of the user.

The still image processing unit 84 plays the still image data sent from the relay device 10 and causes the display 820 to display the still image. Although the still image processing unit 84 can not play the moving image data, it can play the sound data sent from the relay device 10 like the video and sound processing unit 74, and can output the sound to the speaker 8300.

The display control unit 87 is realized by the processing of the CPU 801 in the electronic whiteboard 8 and displays a still image on the display 820, which is an example of the display unit.

The storing and reading unit 89 is realized by the processing of the CPU 801 in the electronic whiteboard 8 and stores various data (or information) in the storage unit 8000 or reads out various data (or information) from the storage unit 8000.

Functional Configuration of the Communication Management Server 9

As illustrated in FIG. 9, the communication management server 9 includes a transmitter and receiver 91, a determiner 93, and a storing and reading unit 99. These units are implemented by the components shown in FIG. 8 and are functions or means implemented by operating according to an instruction from the CPU 901 according to a program expanded on the RAM 903 from the HD 904.

Further, the communication management server 9 has a storage unit 9000 constructed by the ROM 902, the RAM 903 and the HD 904 shown in FIG. 8. Further, in the storage unit 9000, a communication management DB (database) 9001 (shown in FIG. 12), a transmittable image type management DB 9002, and a playable image type management DB 9003 are constructed. The communication management DB 9001 is configured of a communication management table described later. The transmittable image type management DB 9002 is configured of a transmittable image type management table described later. The reproducible image type management DB 9003 is configured of a transmittable image type management table described later.

Communication Management Table

FIG. 10A is a conceptual view of the communication management table. In this communication management table, a terminal ID identifying a sender terminal and a terminal ID identifying a receive terminal are managed in association with each other.

Transmittable Image Type Management Table

FIG. 10B is a conceptual view of a transmittable image type management table. In the transmittable image type management table, a terminal ID identifying a sender terminal and an image type of transmittable images are managed in association with each other. In the table, "None" indicates that nothing is set, "V" indicates Video (moving image), and "S" indicates Still image (still image). When the sender terminal is in the initial state and image data has not been transmitted yet, image types of transmittable images are not managed. The image types of the transmittable images are dynamically changed in response to a request (see S13 described later) from the receive terminal (video conference terminal 7, electronic whiteboard 8). In FIG. 10B, in the case of the device ID "01aa" of the sender terminal, the image type of the transmittable image is changed from "None" to "S", and further from "S" to "S" and "V". The device ID of the sender terminal is an example of sender terminal identification information.

Playable Image Type Management DB

FIG. 10C is a conceptual view of a reproducible image type management table. In the reproducible image type management table, a terminal ID identifying a receive terminal and an image type of a playable image are managed in association with each other.

Functional Configuration of the Communication Management Server

Next, each functional configuration of the communication management server 9 is described in more detail by using FIGS. 10A-10C. The transmitter and receiver 91 of the communication management server 9 is realized by the processing of the network I/F 910 and the CPU 901, and transmits/receives various data (or information) with other servers, devices, and terminals via the communication network 600.

The determiner 93 is realized by the processing of the CPU 901 and makes various determinations.

The storing and reading unit 99 is realized by the processing of the CPU 901, stores various data (or information) in the storage unit 9000, and reads various data (or information) from the storage unit 9000.

Functional Configuration of Relay Device

As shown in FIG. 9, the relay device 10 includes a transmitter and receiver (transfer unit) 101, a determiner 103, and a storing and reading unit 109. These units are implemented by the components shown in FIG. 8 and are functions or means implemented by operating according to an instruction from the CPU 901 according to a program expanded on the RAM 903 from the HD 904.

The relay device 10 further includes a storage unit 10000 configured by the ROM 902, the RAM 903, and the HD 904 shown in FIG. 8. Further, in the storage unit 10000, a transfer image type management DB 10001 is constructed. The transfer image type management DB 10001 is configured by a transfer image type management table described later.

Transfer Image Type Management Table

FIG. 10D is a conceptual view of a transfer image type management table. In the transfer image type management table, a terminal ID identifying a sender terminal, a terminal ID of a receive terminal that can play a moving image, and a terminal ID of a receive terminal that can play a still image are managed in association with each other. Here, the terminal ID "02ab" of the receive terminal that can play a still image is initially associated with the terminal ID "01aa" of the sender terminal. Thereafter, a case is shown in which the device ID "02aa" of the receive terminal that can play the moving image is additionally associated with the device ID "01aa" of the sender terminal. The terminal ID of the receive terminal is an example of receive terminal identification information.

Function Configuration of the Relay Device

Next, each functional configuration of the relay device 10 is described in more detail by using FIG. 9. The transmitter and receiver 101 of the relay device 10 is realized by the processing of the network I/F 1010 and the CPU 1001, and transmits and receives various data (or information) with other servers, devices, and terminals via the communication network 600.

The determiner 103 is realized by the processing of the CPU 1001 and makes various determinations. The storing and reading unit 109 is realized by the processing of the CPU 1001, stores various data (or information) in the storage unit 10000, and reads out various data (or information) from the storage unit 10000.

Processing or Operation of the Present Embodiment

Figure 11:
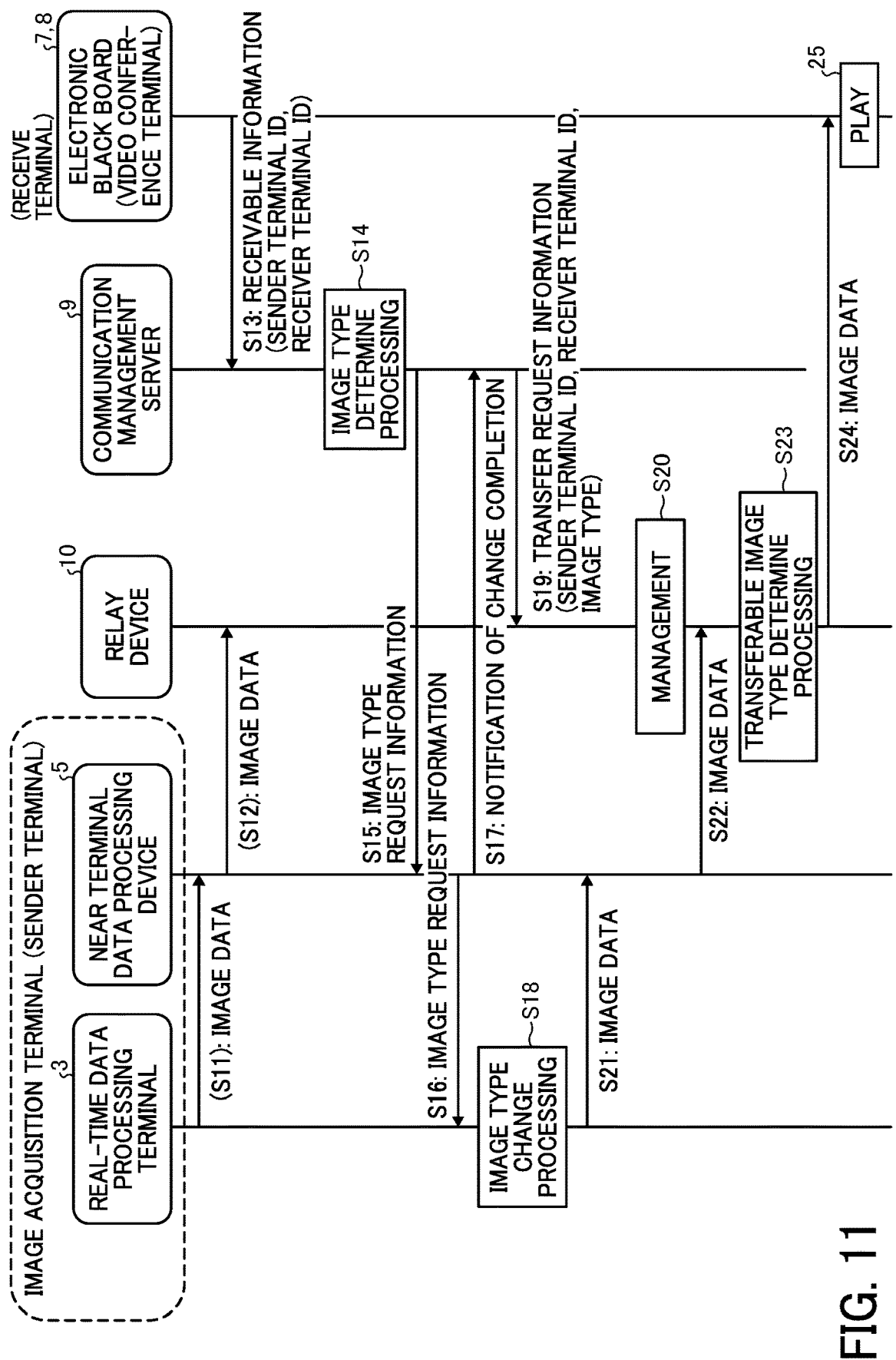
FIG. 11 is a sequence diagram illustration of processing of transmission and reception of image data.

Subsequently, processing or operation of the present embodiment is described by using FIGS. 11 to 14. FIG. 11 is a sequence diagram showing the process of transmitting and receiving image data.

As shown in FIG. 11, the communication unit 48 of the real-time data processing terminal 3 outputs the image data input from the imaging unit 40 and digitized by the image processing unit 34 to the near-terminal data processing device 5 (S11). Next, the transmitter and receiver 51 of the near-terminal data processing device 5 transmits the image data input by the communication unit 58 to the relay device 10 via the communication network 600 (S12). Thereby, the transmitter and receiver 101 of the relay device 10 receives the image data. As described above, the processing in steps S11 and S12 is performed when the image type of the image data to be transmitted has already been determined. In this case, when a frequently used receive terminal is known, the process of changing the image type at the real-time data processing terminal 3 (see S18) is hardly executed, so the processing load of the real-time data processing terminal 3 can be reduced. In addition, the time until receiving the image data on the receive terminal side is reduced.

If the image type of the image data to be transmitted is not determined, the processes of steps S11 and S12 might not be performed. That is, at first, the image acquisition terminal 2 does not transmit image data to the relay device 10. As described above, when the image type is not determined, the image type of the transmittable image managed by the communication management server 9 in the transmittable image type management DB 9002 (see FIG. 10B) is "None". In this case, when there is little use of the receive terminal or when it is not found that the receive terminal that can play any image type of still image or moving image is used, the image acquisition terminal (sender terminal) can save network bandwidth for communication from the device to the relay device 10.

On the other hand, when the power switch 822 is turned on, the transmitter and receiver 81 of the electronic whiteboard 8 transmits receivable information indicating that the image data can be received to the communication management server 9 (S13). The receivable information includes the terminal ID of the sender terminal for specifying the request destination (transmission source), and the terminal ID of the receive terminal for specifying the own device as the request source (transmission destination). Thereby, the transmitter and receiver 91 of the communication management server 9 receives the receivable information.

Figure 12:
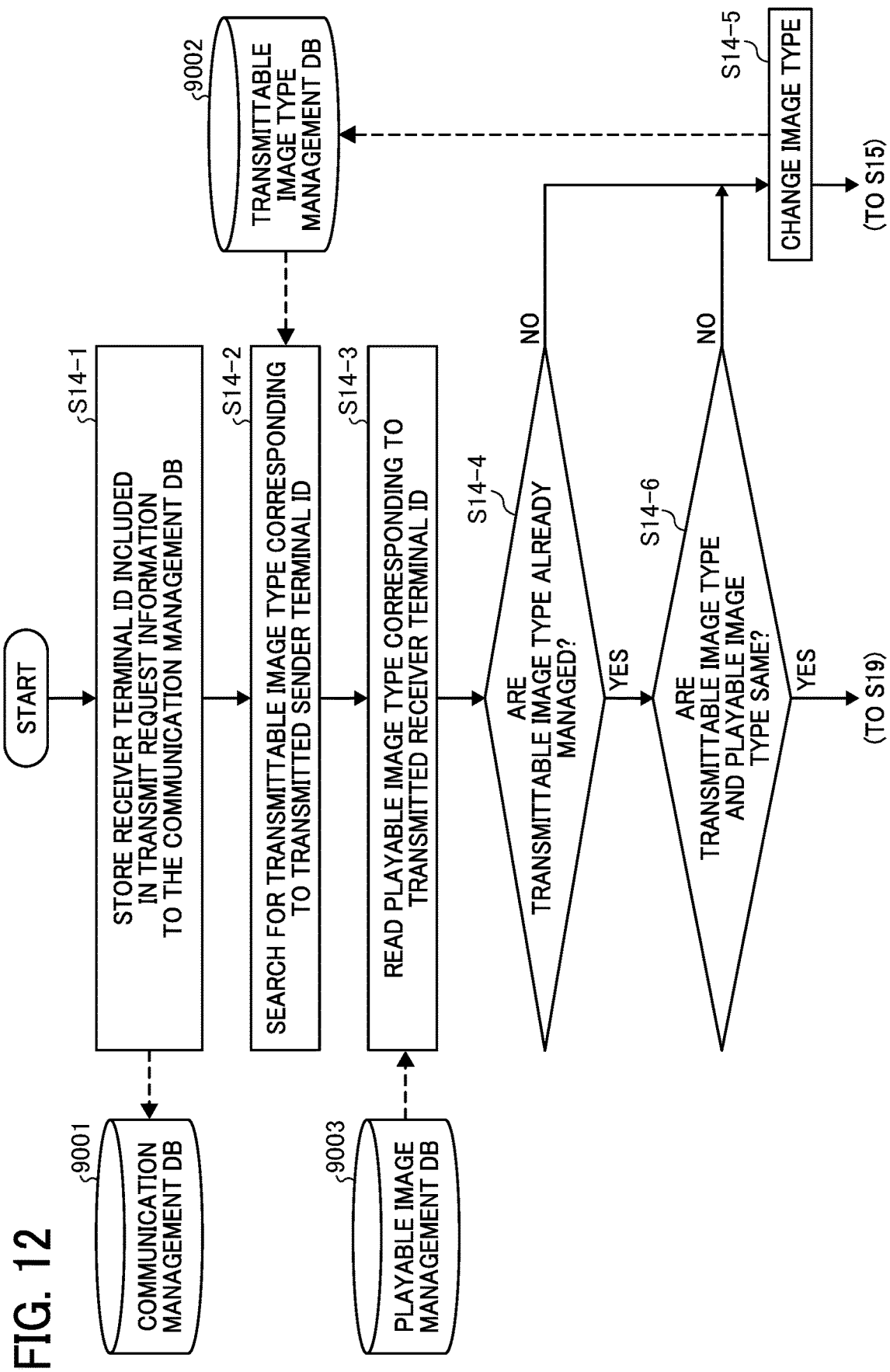
FIG. 12 is a flowchart illustrating a decision processing of image type.

Next, the communication management server 9 performs a process of determining the image type of the image data (S14). Here, the determination processing of the image type is described by using FIG. 12. FIG. 12 is a flowchart showing an image type determination process.

As shown in FIG. 12, the storing and reading unit 99 stores the device ID of the receiving device included in the receivable information in the communication management DB 9001 (S14-1). In this case, a new record is created in the communication management DB 9001.

Next, the storing and reading unit 99 searches the transmittable image type management DB 9002 using the device ID of the transmission device received in step S13 as a search key (S14-2). Further, the storing and reading unit 99 reads out the image type of the corresponding playable image by searching the playable image type management DB 9003 using the terminal ID of the receive terminal received in step S13 as a search key (S14-3). Note that either of the processes of step S14-2 and step S14-3 can be performed first.

Next, the determiner 93 determines whether or not any image type is already managed by the search in step S14-2 (step S14-4). Then, in step S14-5 if the image type is not managed (NO in step S14-4), the storing and reading unit 99 changes, in the playable image type management DB 9003, the transmittable image corresponding to the terminal ID of the sender terminal received in step S13 in the transmittable image type management DB 9002 from "none" to the same image type as the image type of the playable image corresponding to the terminal ID of the receive terminal received in step S13. Here, since the electronic whiteboard 8 transmits the first receivable information to a specific sender terminal, as shown in FIG. 10B, the image types of transmittable images are changed from "None" to "S".

On the other hand, if, in step S14-4, the determiner 93 determines that the type of image is already managed, the determiner 93 determines further whether the image type of transmittable image read in step S14-2 is the same as the image type of the playable image read in step S14-3 (S14-6). Then, if it is determined by the determiner 93 that they are the same (YES in step S14-6), the process proceeds to step S19. On the other hand, when the determiner 93 determines that they are not the same (different) (NO in step S14-16), the storing and reading unit 99 changes the image types as a whole with respect to the image type already managed in the transmittable image type management DB 9002 by adding the same image type as the image type of the playable image corresponding to the terminal ID of the receive terminal received in step S13 in the image type management DB 9003 (S14-5). For example, as shown in FIG. 10B, by adding "V" to the image type "S" of transmittable images, the image types as a whole are changed from "S" to "S, V".

Subsequently, after the process of step 14-5 is executed, the description is continued by returning to FIG. 11.

The transmitter and receiver 91 of the communication management server 9 transmits image type request information, indicating that image data of playable image types is requested, to the near-terminal data processing device 5 via the communication network 600 (S15). Thereby, the transmitter and receiver 51 of the near-terminal data processing device 5 receives the image type request information.

Next, the communication unit 58 of the near-terminal data processing device 5 outputs the image type request information received by the transmitter and receiver 51 to the communication unit 48 of the real-time data processing terminal 3 (S16). If the real-time data processing terminal 3 does not output image data to the near-terminal data processing device 5 in the initial state in step S11, the type request information input by the real-time data processing terminal 3 in step 16 also serves as image transmission request information indicating a request to start transmission of image data.

Furthermore, the transmitter and receiver 51 of the near-terminal data processing device 5 transmits a change completion notification, indicating that the change of the image type is completed, to the communication management server 9 via the communication network 600 (S17). Thereby, the transmitter and receiver 91 of the communication management server 9 receives the change completion notification. The near-terminal data processing device 5 inquires of the real-time data processing terminal 3 whether or not the change is completed, and after receiving a response indicating that the change is completed, the process of step S17 may be performed.

Figure 13:
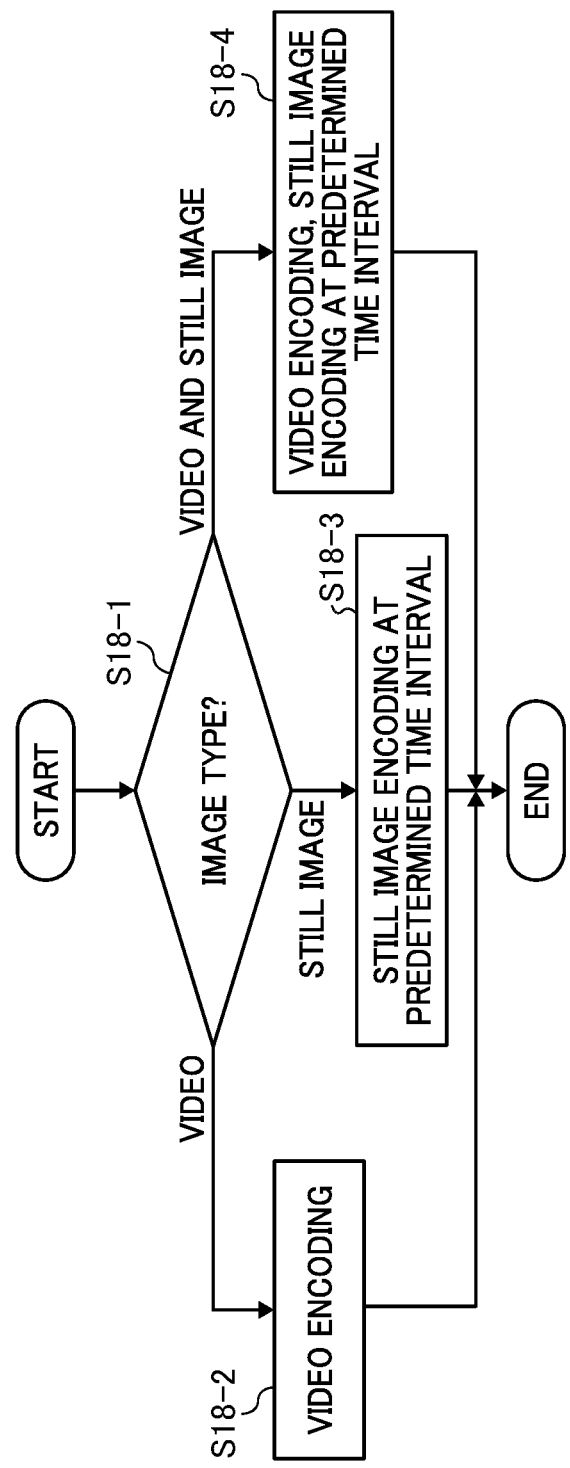
FIG. 13 is a flowchart illustrating a determination processing of an image type of a playable image data.

Next, the real-time data processing terminal 3 performs a process of changing the image type of playable image data (S18). Here, the process of changing the image type is described with reference to FIG. 13. FIG. 13 is a flowchart showing the process of changing the image type of reproducible image data.

As shown in FIG. 13, the determiner 33 of the real-time data processing terminal 3 determines the image type indicated by the image type request information received at step S16 (S18-1). Then, when the requested image type is "moving image," the image processing unit 34 encodes the moving image data input from the imaging unit 40 into a general-purpose moving image format such as H.264 (S18-2). When the requested image type is "still image," the image processing unit 34 encodes the image data input from the imaging unit 40 at a predetermined time into a general-purpose still image format such as JPEG Encode with the predetermined intervals (for example, 1 second intervals) (S18-3).

Furthermore, when the requested image type is "moving image" and "still image," the image processing unit 34 encodes the image data input from the imaging unit 40 into a general-purpose moving image format such as H.264 and into a general-purpose still image format such as JPEG (S18-4). The following three patterns can be mentioned as cases of encoding both moving image and still image:

(1) When there is a request for moving image data from the video conference terminal 7 after there is a request first for still image data from the electronic whiteboard 8;

(2) When there is a request for still image data from the electronic whiteboard 8 after there is a request first for moving image data from the video conference terminal 7; and (3) When there is a request for both moving image data and still image data from a third device that can play both moving images and still images.

On the other hand, in the communication management server 9, after the process of step S17, or when the determiner 93 determines that both image types are the same in step S14-4, the transmitter and receiver 91 transmits the transfer request information indicating a request to transfer image data to the relay device 10 (S19). The transmission request information includes the terminal ID of the sender terminal received in step S13 and the terminal ID of the receive terminal, and the image type read out in step S14-2. Thereby, the transmitter and receiver 101 of the relay device 10 receives the transfer request information.

Next, in the relay device 10, the storing and reading unit 109 stores and manages the terminal ID of the sender terminal and the terminal ID of the receive terminal contained in the transfer request information in the transfer image type management DB 10001 (S20). In this case, when the type of image included in the transfer request information is "V", the terminal ID of the receive terminal included in the transfer request information is managed in the field of "Terminal ID of the receive terminal playable moving images." Also, when the image type included in the transfer request information is "S", the terminal ID of the receive terminal included in the transfer request information is managed in the field of "Terminal ID of the receive terminal playable a still image." Here, since the electronic whiteboard 8 transmits the receivable image information in step S13, the terminal ID "02ab" of the electronic blackboard 8 as the receive terminal is managed in the field of "Terminal ID of the receive terminal playable still images."

On the other hand, in the real-time data processing terminal 3, the communication unit 48 outputs the image data of the still image to the communication unit 58 of the near-terminal data processing device 5 by the change processing of the image type in step S18 (S21). Then, the transmitter and receiver 51 of the near-terminal data processing device 5 transmits the image data of the still image input by the communication unit 58 to the relay device 10 via the communication network 600 (S22). Thereby, the transmitter and receiver 101 of the relay device 10 receives the image data of the still image.

Figure 14:
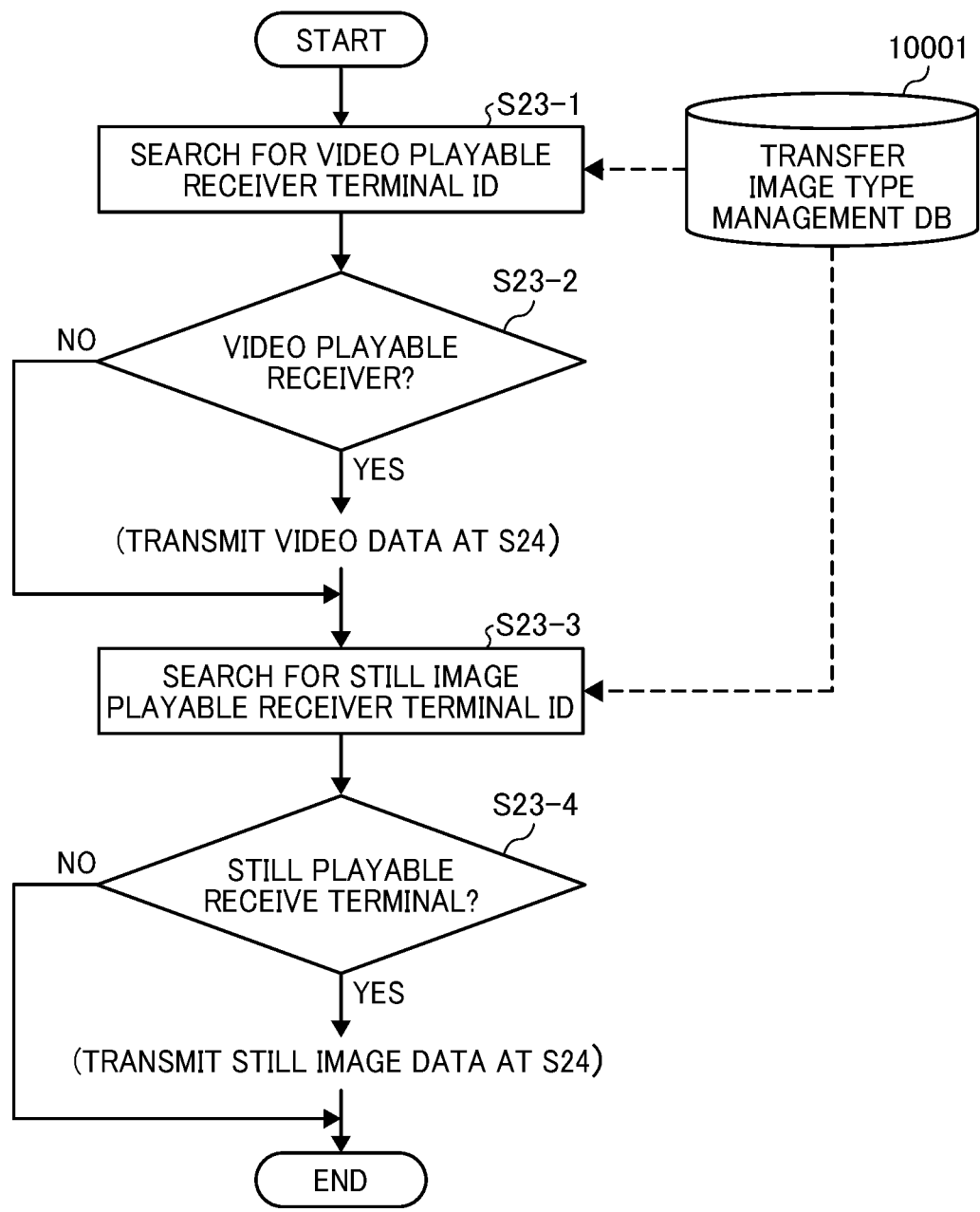
FIG. 14 is a flowchart illustrating a decision processing of image type.

Next, the relay device 10 performs determination processing of transferable image types (S23). Here, the process of determining the type of image data that can be transferred is described in detail with reference to FIG. 14. FIG. 14 is a flowchart showing determination processing of image types of transferable image data.

First, the storing and reading unit 109 searches the field of "Terminal ID of receive terminal playable moving image" of the transfer image type management DB 10001 using the terminal ID of the sender terminal as a search key (S23-1). The terminal ID of the sender terminal is acquired from the near-terminal data processing apparatus 5 by the relay device when the communication session is established between the near terminal data processing apparatus 5 and the relay device 10 before step S12.

Then, the determiner 103 determines whether the receive terminal can play moving images or not, based on whether the terminal ID is managed in the field of "Terminal ID of receive terminal playable moving image" (S23-2). Then, if the determiner 103 determines that the terminal ID is managed, that is, if the receive terminal determines that the moving image can be played (YES), the transmitter and receiver 101 functions as a transfer unit and transfers the image data of the moving image to the receive terminal (S24). Thereby, the receive terminal receives the image data of the moving image. Here, since the receive terminal is the electronic whiteboard 8, the image data of the moving image is not transferred in step S24.

Subsequently, in step S23-2, after the determiner 103 determines that the terminal ID is managed, that is, determines that the receive terminal can play the moving image (YES), and after the moving image is transferred in step S24 or after the determiner 103 determines that the terminal ID is not managed, that is, after determining that the receive terminal cannot play the moving image (NO), the storing and reading unit 109 searches the field of "Terminal ID of receive terminal playable still image reproduction" in the transfer image type management DB 10001 by using the terminal ID as a search key. Then, the determiner 103 determines whether the still image is playable or not according to whether the terminal ID is managed in the field of "Terminal ID of the receive terminal playable still image" (S23-4). Then, if the determiner 103 determines that the terminal ID is managed, that is, if determining that the receive terminal can play the still image (YES), the transmitter and receiver 101 functions as a transfer unit and transfers image data of a still image to the electronic whiteboard 8 (S24). Thus, the receive terminal receives the image data of the still image. Here, since the receive terminal is the electronic whiteboard 8, in step S24, the image data of the still image is transferred, and the transmitter and receiver 81 of the electronic whiteboard 8 receives the image data of the still image.

On the other hand, in step S23-4, when the determining unit 103 determines that the device ID is not managed, that is, determines that the receive terminal cannot play the still image (NO), the process ends. That is, the transmitter and receiver 101 does not transfer the image data of the still image to the electronic whiteboard 8 as the transfer unit.

Next, the receive terminal plays the image data (S25). Here, since the receive terminal is the electronic whiteboard 8, the display control unit 87 plays (displays) the still image on the display 820. Thus, the process of transmitting and receiving image data is completed.

Subsequently, a case where the video conference terminal 7, which can play moving image data as a receive terminal, further transmits receivable information in step S13 is described. In this case, when the power switch 709 of the video conference terminal 7 is turned on or the like, receivable information is transmitted in step S13. Further, since the image type managed in the field of "image type of transmittable image" of the transmittable image type management DB 9002 is "S", the image type "V" is added, and in step S14-5, as shown in FIG. 10B, two image types "S" and "V" are managed. Also, in this case, the processes of steps S15 to S25 are performed. In this case, in step S18, the process of step S18-4 is performed. In step S23, the determination unit 103 determines in step S23-2 that the receive terminal can play a moving image (YES), and the image data of the moving image is transferred in step S24. Thereby, the electronic whiteboard 8 receives the image data of the moving image and the still image and can play the still image, and the video conference terminal 7 receives the image data of the moving image and the still image and can play the moving image.

In the above embodiment, the case is described where another receive terminal (video conference terminal 7) for playing image data of an image type different from the receive terminal (electronic whiteboard 8) already used is newly used, but the disclosure is not limited to this. For example, when the video conference terminal 7 or the electronic whiteboard 8 can play both image types (still image and moving image), an image of one image type is played, and then an image of the other image type is changed to play. In addition, when the video conference terminal 7 or the electronic whiteboard 8 can play both types of images (still images and moving images), an image of one type of image is played and then an image of the other type of image is added and played.

Main Effects of the Embodiment

As described above, according to the present embodiment, when the image types of image data that is transmittable by the sender terminal (the image acquisition terminal 2 or the like) and the image types of image data that is playable by the receive terminal (the video conference terminal 7 and the electronic whiteboard 8) are not the same, the communication management server 9 requests the sender terminal to transmit image data of image types that are playable on the receive terminal. As a result, when another receive terminal that plays image data of an image type different from the receive terminal already used is used, or even when the image data being played by the receive terminal that is already used is changed to a different image type, the receive terminal can play the image data.

Supplement

Each component, such as each of the CPUs 301, 501, 701, 901, and 1001, can be single or plural.

The communication management server 9 can be constructed by a single computer or can be constructed by a plurality of computers.

As shown in FIGS. 10B and 10C, the transmittable image type management DB 9002 and the playable image type management DB 9003 are described as different DBs, but can be integrated into one DB.

Furthermore, each function in the embodiments described above can be realized by one or more processing circuits. Here, the "processing circuit" in the present embodiment includes a processor programmed to execute each function by software like an processor implemented by an electronic circuit, or an ASIC designed to execute each function described above, and includes devices such as an application specific integrated circuit (DSP), a digital signal processor (DSP), a field programmable gate array (FPGA), a system on a chip (SOC), a GPU, and a conventional circuit module.

The invention claimed is:

1. A communication management server that manages communication with a sender terminal that transmits image data and a receive terminal that receives the image data, the communication management server comprising:
   processing circuitry configured to
      receive, from the receive terminal, sender terminal identification information identifying the sender terminal, and receive terminal identification information identifying the receive terminal; and
      transmit, to the sender terminal, request information indicating a request for transmitting image data of a first image type playable by the receive terminal, when a second image type of image data transmittable by the sender terminal according to the sender terminal identification information, and the first image type of image data playable by the receive terminal, according to the receive terminal identification information, are different,
   wherein the processing circuitry is further configured not to transmit, to the sender terminal, the request information, when the second image type transmittable by the sender terminal according to the sender terminal identification information and the first image type playable by the receive terminal according to the receive terminal identification information are the same.

2. The communication management server according to claim 1, further comprising:
   a first memory to store, for each predetermined sender terminal of at least one predetermined sender terminal, predetermined sender terminal identification information identifying the predetermined sender terminal in association with image types transmittable by the predetermined sender terminal; and
   a second memory to store, for each predetermined receive terminal of at least one predetermined sender terminal, predetermined receive terminal identification information identifying the predetermined receive terminal in association with image types playable by the predetermined receive terminal,
   wherein the processing circuitry is further configured to transmit, to a specific sender terminal indicated by a specific sender terminal identification information, the request information, when a specific image type corresponds to the sender terminal identification information stored in the first memory, and the specific image type corresponds to the specific receive terminal identification information stored in the second memory are different.

3. The communication management server according to claim 2, wherein the first memory and the second memory are constructed by a same database or different databases.

4. The communication management server according to claim 1, wherein the first and second image types each indicate one of a still image and a moving image.

5. The communication management server according to claim 2, wherein the processing circuitry is further configured to communicate with a relay device that relays image data transmitted from the sender terminal and transmits the image data to the receive terminal, and the processing circuitry is further configured to transmit, to the relay device, the specific sender terminal identification information, the specific receive terminal identification information, and the image types playable by the specific receive terminal.

6. A communication system, comprising:
the communication management server of claim 1; and
the sender terminal.

7. The communication system according to claim 6, wherein the sender terminal is configured to encode the image data according to the first image type indicated by the request information.

8. A method executed by a communication management server that manages communication with a sender terminal that transmits image data and a receive terminal that receives the image data, the method comprising:
receiving, from the receive terminal, sender terminal identification information identifying the sender terminal, and receive terminal identification information identifying the receiving device;
transmitting, to the sender terminal, request information indicating a request for transmitting image data of a first image type playable by the receive terminal, when a second image type of image data transmittable by the sender terminal according to the sender terminal identification information, and the first image type of image data playable by the receive terminal, according to the receive terminal identification information, are different; and
not transmitting, to the sender terminal, the request information, when the second image type transmittable by the sender terminal according to the sender terminal identification information and the first image type playable by the receive terminal according to the receive terminal identification information are the same.

9. A non-transitory computer-readable medium storing a program that, when executed, causes a computer to perform the method of claim 8.

10. The method of claim 8, wherein the first and second image types each indicate one of a still image and a moving image.

11. A non-transitory computer-readable medium storing instructions, which when executed by processing circuitry, cause the processing circuitry to perform a method of managing communication with a sender terminal that transmits image data and a receive terminal that receives the image data, the method comprising:
receiving, from the receive terminal, sender terminal identification information identifying the sender terminal, and receive terminal identification information identifying the receiving device;
transmitting, to the sender terminal, request information indicating a request for transmitting image data of a first image type playable by the receive terminal, when a second image type of image data transmittable by the sender terminal according to the sender terminal identification information, and the first image type of image data playable by the receive terminal, according to the receive terminal identification information, are different; and
not transmitting, to the sender terminal, the request information, when the second image type transmittable by the sender terminal according to the sender terminal identification information and the first image type playable by the receive terminal according to the receive terminal identification information are the same.

* * * * *